United States Patent
Watanabe

(10) Patent No.: US 8,178,009 B2
(45) Date of Patent: May 15, 2012

(54) SLURRY FOR SECONDARY BATTERY ELECTRODE, ELECTRODE FOR SECONDARY BATTERY, PROCESS FOR PRODUCTION OF ELECTRODE FOR SECONDARY BATTERY, AND SECONDARY BATTERY

(75) Inventor: Tsuyoshi Watanabe, Tokyo (JP)

(73) Assignee: Sumitomo Bakelite Co., Ltd., Tokyo (JP)

( * ) Notice: Subject to any disclaimer, the term of this patent is extended or adjusted under 35 U.S.C. 154(b) by 425 days.

(21) Appl. No.: 12/447,934

(22) PCT Filed: Oct. 25, 2007

(86) PCT No.: PCT/JP2007/071265
§ 371 (c)(1),
(2), (4) Date: Apr. 30, 2009

(87) PCT Pub. No.: WO2008/056585
PCT Pub. Date: May 15, 2008

(65) Prior Publication Data
US 2010/0075222 A1    Mar. 25, 2010

(30) Foreign Application Priority Data
Nov. 7, 2006   (JP) ................. 2006-301750

(51) Int. Cl.
*H01B 1/12* (2006.01)
*H01M 6/16* (2006.01)

(52) U.S. Cl. .............. 252/521.2; 252/519.1; 252/518.1; 252/500; 429/199

(58) Field of Classification Search ............. 252/521.2, 252/519.1, 518.1, 500; 429/199
See application file for complete search history.

(56) References Cited

U.S. PATENT DOCUMENTS

| | | | | |
|---|---|---|---|---|
| 4,463,072 A * | 7/1984 | Gifford et al. | ................ | 429/336 |
| 5,962,169 A * | 10/1999 | Angell et al. | ................ | 429/309 |
| 7,238,451 B2 * | 7/2007 | Frech et al. | ................ | 429/314 |
| 7,241,535 B2 * | 7/2007 | Kim et al. | ................ | 429/324 |
| 7,722,989 B2 * | 5/2010 | Ohzuku et al. | ................ | 429/223 |
| 7,833,664 B2 * | 11/2010 | Fujita et al. | ................ | 429/247 |
| 2005/0175898 A1 | 8/2005 | Yong et al. | | |

FOREIGN PATENT DOCUMENTS

| | | |
|---|---|---|
| JP | 2000-1306 | 1/2000 |
| JP | 2001-102046 | 4/2001 |
| JP | 2004-22294 | 1/2004 |
| JP | 2006-49158 | 2/2006 |
| JP | 2006-185831 | 7/2006 |

* cited by examiner

*Primary Examiner* — Douglas McGinty
(74) *Attorney, Agent, or Firm* — Ditthavong Mori & Steiner, P.C.

(57) ABSTRACT

There is provided a slurry for a secondary battery electrode and an electrode for a secondary battery that produce satisfactory charge-discharge characteristics for secondary batteries, as well as a secondary battery that exhibits satisfactory charge-discharge characteristics. The invention provides a slurry for a secondary battery electrode comprising an electrode active material and an ambient temperature molten salt composed of a cation component and an anion component, an electrode for a secondary battery wherein an electrode active material layer is formed by coating the slurry for a secondary battery electrode onto a current collector, a process for production of an electrode for a secondary battery whereby the slurry for a secondary battery electrode is coated onto a current collector metal foil to form a coated film, and a secondary battery comprising a positive electrode and/or negative electrode fabricated using the electrode for a secondary battery, and an electrolyte.

15 Claims, No Drawings

SLURRY FOR SECONDARY BATTERY ELECTRODE, ELECTRODE FOR SECONDARY BATTERY, PROCESS FOR PRODUCTION OF ELECTRODE FOR SECONDARY BATTERY, AND SECONDARY BATTERY

TECHNICAL FIELD

The present invention relates to a slurry for a secondary battery electrode, an electrode obtained using the slurry, a process for production of the electrode and a secondary battery obtained using the electrode.

BACKGROUND ART

As electronic devices become smaller and lighter in weight with greater portability, research and development continue toward secondary batteries with higher voltage and higher energy density characteristics. The rapid advancement in performance of recent portable electronic devices is leading, in particular, to comparable rapid increase in their power consumption. A demand therefore exists for secondary batteries that can realize even higher voltage and higher energy density.

Such secondary batteries have led to demand for ionic conductive electrolytes with high withstand voltage, that exhibit high ionic conductivity and are electrochemically stable in a wide potential range, and therefore numerous attempts have been made recently to utilize ambient temperature molten salts that are flame retardant and noncombustible, in electrochemical devices such as secondary batteries and electrical double layer capacitors. (For example, see Japanese Unexamined Patent Publication No. 2002-110230).

One common method for fabricating secondary battery electrodes is a method in which a solution of a binder material in a polar organic solvent is prepared first, active materials and other electrode components are added to the solution to prepare a slurry, and the slurry is coated and dried onto a metal foil as the current collector to form an active material layer, which is then roll pressed. When the solvent is removed by drying in this method, the active material layer can become non-uniform due to, for example, voids produced at the sections where the solvent was present. When a secondary battery is fabricated using such electrodes, a separator is sandwiched between the positive electrode and negative electrode to prevent shorting, and when the electrolyte solution is injected therein to form a secondary battery it is important for the electrolyte solution to penetrate through the electrodes. However, electrolytes obtained using ambient temperature molten salts, for example, have high viscosity and penetrate poorly into electrodes, thus making it difficult to obtain satisfactory charge-discharge characteristics for the secondary battery.

DISCLOSURE OF THE INVENTION

The present invention provides a slurry for a secondary battery electrode and an electrode for a secondary battery that exhibit satisfactory charge-discharge characteristics for secondary batteries, as well as a secondary battery that exhibits satisfactory charge-discharge characteristics.

The present inventors have conducted much diligent research with the aim of achieving the object stated above, and as a result have discovered that satisfactory charge-discharge characteristics can be obtained by using a slurry containing an electrode active material and an ambient temperature molten salt composed of a cation component and an anion component to form an electrode, and applying the electrode in a secondary battery, and upon still further research the present invention has been completed.

Specifically, the present invention provides the following.

(1) A slurry for a secondary battery electrode, comprising an electrode active material and an ambient temperature molten salt composed of a cation component and an anion component.

(2) A slurry for a secondary battery electrode according to (1), which further contains a polymer.

(3) A slurry for a secondary battery electrode according to (1) or (2), which further contains a lithium salt.

(4) A slurry for a secondary battery electrode according to (2) or (3), wherein the polymer is a polymer synthesized from a monomer component which includes a salt monomer composed of an onium cation having a polymerizable functional group and an organic anion having a polymerizable functional group.

(5) A slurry for a secondary battery electrode according to any one of (1) to (4), wherein the anion component of the ambient temperature molten salt contains a fluorosulfonyl group.

(6) A slurry for a secondary battery electrode according to any one of (1) to (5), which further contains an organic solvent.

(7) A slurry for a secondary battery electrode according to any one of (1) to (6), which is for a positive electrode.

(8) A slurry for a secondary battery electrode according to (7), which contains at least one compound selected from the group consisting of manganese complex oxides, nickel complex oxides, cobalt complex oxides and iron complex oxides as the electrode active material.

(9) A slurry for a secondary battery electrode according to any one of (1) to (6), which is for a negative electrode.

(10) A slurry for a secondary battery electrode according to (9), wherein the electrode active material is a carbon-based material.

(11) A slurry for a secondary battery electrode according to (10), wherein the carbon-based material is a nitrogen-containing carbon material.

(12) An electrode for a secondary battery, which comprises a current collector and an electrode active material layer, the electrode active material layer being formed by coating the current collector with a slurry for a secondary battery electrode according to any one of (1) to (11).

(13) A process for production of an electrode for a secondary battery, which comprises coating a current collector metal foil with a slurry for a secondary battery electrode according to any one of (1) to (11) to form a coated film on the current collector metal foil.

(14) A process for production of an electrode for a secondary battery according to (13), which comprises heating and cooling the coated film to immobilize the electrode active material in the slurry for a secondary battery electrode on the current collector metal foil.

(15) A secondary battery comprising a positive electrode, a negative electrode and an electrolyte, wherein either or both the positive electrode and negative electrode are electrodes for a secondary battery according to (12).

(16) A secondary battery according to (15), wherein the electrolyte contains an ambient temperature molten salt composed of a cation component and an anion component.

(17) A secondary battery according to (16), wherein the anion component of the ambient temperature molten salt contains a fluorosulfonyl group.

According to the invention it is possible to provide an electrode for a secondary battery which comprises a flame retardant, noncombustible ambient temperature molten salt, and secondary batteries employing the electrode exhibit satisfactory charge-discharge characteristics.

BEST MODE FOR CARRYING OUT THE INVENTION

The invention provides a slurry for a secondary battery electrode which comprises an electrode active material and an ambient temperature molten salt composed of a cation component and an anion component. The invention further provides an electrode for a secondary battery which comprises a current collector and an electrode active material layer, the electrode active material layer being formed by coating the current collector with the slurry for a secondary battery electrode.

The invention further provides a process for production of an electrode for a secondary battery, whereby the aforementioned slurry for a secondary battery electrode is coated onto a current collector metal foil to form a coated film.

The invention further provides a secondary battery comprising a positive electrode, negative electrode and electrolytes, wherein the positive and negative electrodes are the aforementioned type of electrode for a secondary battery.

In an electrode for a secondary battery according to the invention, fabricated using a slurry for a secondary battery electrode according to the invention, the ambient temperature molten salt is present between the electrode active materials. The charge-discharge characteristics are therefore more satisfactory in such a secondary battery containing the electrode for a secondary battery.

Ordinary positive electrode active materials and negative electrode active materials may be used as the electrode active materials for the invention.

Specifically, depending on the purpose, a slurry for a secondary battery electrode for the positive electrode is obtained when a positive electrode active material is used as the electrode active material, and a slurry for a secondary battery electrode for the negative electrode is obtained when a negative electrode active material is used as the electrode active material.

As positive electrode active materials there are preferred lithium-containing transition metal oxides which have high energy density and excellent reversible intercalation/deintercalation of lithium ions, and as examples there may be mentioned cobalt complex oxides such as $LiCoO_2$, manganese complex oxides such as $LiMn_2O_4$, nickel complex oxides such as $LiNiO_2$, mixtures of these oxides or $LiNiO_2$ having a portion of the nickel replaced with cobalt or manganese, and iron complex oxides such as $LiFePO_4$ or $LiFeVO_4$.

There are no particular restrictions on negative electrode active materials so long as they are materials capable of intercalation and deintercalation of lithium ion, but carbon-based materials are preferred. Specifically, there may be mentioned natural graphite, amorphous carbon, graphite, mesocarbon microbeads, mesophase pitch-based carbon fibers, and carbon materials obtained by carbonization of simple resins. As carbon materials obtained by carbonization of simple resins there may be mentioned polyacrylonitrile-based carbon obtained from polyacrylonitrile and the like, phenol resin-based carbon obtained from phenol resins produced using starting materials that contain phenols such as phenol, nitrophenol or cresol, nitrogen-containing carbon materials obtained from resins produced using nitrogen atom-containing starting materials, such as phenol resins obtained using nitrophenol, or melamine resins, and carbon materials obtained by carbonization of mixtures of two or more of these resins. Among carbon materials obtained by carbonization of resins, there are preferred nitrogen-containing carbon materials obtained by carbonization of resins that are produced using nitrogen atom-containing starting materials, in order to further improve the charge-discharge characteristics.

The ambient temperature molten salt used in the slurry for a secondary battery electrode according to the invention is composed of a cation component and an anion component. An ambient temperature molten salt is a salt that is at least partly liquid at ordinary temperature. According to the invention, "ordinary temperature" means the temperature range in which a battery is assumed to operate normally, as described in Japanese Unexamined Patent Publication No. 2002-110230, for example, and typically this has an upper limit of about 100° C. and a lower limit of about −50° C.

The cation component of the ambient temperature molten salt may be a cation having at least one group produced by coordination of a cationic atomic group with a compound containing an element with a lone electron pair, and as elements with lone electron pairs there may be mentioned elements such as nitrogen, sulfur, phosphorus, oxygen, selenium, tin, iodine and antimony. Specific examples of such cation components include onium cations, among which onium cations with lone electron pairs of nitrogen, sulfur or phosphorus are preferred. Particularly preferred are cation components that are electrochemically stable in a wide potential range. Quaternary ammonium cations are preferred from this viewpoint, and particularly preferred are quaternary ammonium cations containing monovalent groups such as alkyl, alkoxyalkyl, aralkyl or aryl groups. A monovalent group for the quaternary ammonium cation is a group having one bonding site allowing the end of the group to bond with the "$N^+$" portion of the ammonium cation.

The quaternary ammonium cation may have a cyclic structure such as the nitrogen-containing heterocyclic structure described hereunder. The quaternary ammonium cation may further contain a heteroatom (that is, an atom other than carbon or hydrogen), such as a heteroatom in the skeleton of a nitrogen-containing heterocyclic structure, and/or a halogen atom as a substituent in the quaternary ammonium cation.

More specifically, it is preferably a cation component represented by the following formula (6).

$$N^+R_1R_2R_3R_4 \qquad (6)$$

In formula (6), $R_1$, $R_2$, $R_3$ and $R_4$ each independently represent any monovalent group selected from the group consisting of alkyl, alkoxyalkyl, aralkyl and aryl groups, or when two or more from among $R_1$, $R_2$, $R_3$ and $R_4$ form a nitrogen-containing heterocyclic structure containing $N^+$ and there are groups from among $R_1$, $R_2$, $R_3$ and $R_4$ that do not form a nitrogen-containing heterocyclic structure, those groups are any monovalent groups selected from the group consisting of alkyl, alkoxyalkyl, aralkyl and aryl groups.

The cation component of formula (6) may further contain a heteroatom as described above.

More preferably, each of the monovalent groups of the quaternary ammonium cation are selected from the group consisting of alkyl, alkoxyalkyl and aralkyl groups, and most preferably are alkyl groups or alkoxyalkyl groups.

As alkyl groups there may be mentioned methyl, ethyl and propyl, as alkoxyalkyl groups there may be mentioned methoxymethyl, methoxyethyl, (methoxyethoxy)ethyl, (hydroxyethoxy)ethyl, (hydroxyethyl)methylamino, methoxy(carbonylethyl) and hydroxyethyl, as an aralkyl group there may be mentioned benzyl, and as aryl groups there may be mentioned phenyl and naphthyl.

As examples of cyclic structures there may be mentioned nitrogen-containing heterocyclic structures that form oxazolyl, morpholinyl, pyridinium, pyrralidinium, pyrrolidinium, piperadinium, quinolinium, piperidinium and imidazolium groups. These are also examples of heteroatom-containing structures.

As specific examples of cation components for ambient temperature molten salts there may be mentioned ammonium cations such as tetramethylammonium cation, tetraethylammonium cation, tetrapropylammonium cation, tetrapentylammonium, ethyltrimethylammonium cation, vinyltrimethylammonium cation, triethylmethylammonium cation, triethylpropylammonium cation, diethyldimethylammonium cation, tributylethylammonium cation, triethylisopropylammonium cation, triethylmethoxymethylammonium cation, trimethylpropylammonium cation, trimethylisopropylammonium cation, butyltrimethylammonium cation, allyltrimethylammonium cation, hexyltrimethylammonium cation, octyltrimethylammonium cation, dodecyltrimethylammonium cation, triethylmethoxyethoxymethylammonium cation, dimethyldipropylammonium cation and hexamethonium cation; imidazolinium cations such as 1,2,3-trimethylimidazolinium, 1,2,3-triethylimidazolinium, 1,3,4-trimethylimidazolinium, 1,2,3,4-tetramethylimidazolinium, 1,3-dimethyl-2-ethylimidazolinium, 1-ethyl-2,3-dimethylimidazolinium, 4-ethyl-1,3-dimethylimidazolinium, 1,2-diethyl-3-methylimidazolinium, 1,4-diethyl-3-methylimidazolinium, 1,2-diethyl-3,4-dimethylimidazolinium, 1,4-diethyl-2,3-dimethylimidazolinium, 2,4-diethyl-1,3-dimethylimidazolinium, 4,5-diethyl-1,3-dimethylimidazolinium, 1-ethyl-2,3,4-trimethylimidazolinium, 2-ethyl-1,3,4-trimethylimidazolinium, 4-ethyl-1,2,3-trimethylimidazolinium, 1,2,3-triethyl-4-methylimidazolinium, 1,3,4-triethyl-2-methylimidazolinium, 1,3,4-triethyl-5-methylimidazolinium, 1,4,5-triethyl-3-methylimidazolinium, 2,3,4-triethyl-1-methylimidazolinium, 1,1-dimethyl-2-heptylimidazolinium, 1,1-dimethyl-2-dodecylimidazolinium, 1,1-dimethylimidazolinium, 1,1,2-trimethylimidazolinium, 1,1,2,4-tetramethylimidazolinium, 1,1,2,4,5-pentamethylimidazolinium and 1-tert-butyl-3-isopropylimidazolinium cation; imidazolium cations such as 1,3-dimethylimidazolium, 1-ethyl-3-methylimidazolium, 1,3-diethylimidazolium, 1,2,3-trimethylimidazolium, 1,3,4-trimethylimidazolium, 1-ethyl-2,3-dimethylimidazolium, 2-ethyl-1,3-dimethylimidazolium, 4-ethyl-1,3-dimethylimidazolium, 1,2-diethyl-3-methylimidazolium, 1,5-diethyl-3-methylimidazolium, 1,3-diethyl-2-methylimidazolium, 1,2,3-triethylimidazolium, 1,2,3,4-tetramethylimidazolium, 1-ethyl-2,3,4-trimethylimidazolium, 2-ethyl-1,3,4-trimethylimidazolium, 4-ethyl-1,2,3-trimethylimidazolium, 1,2-diethyl-3,4-dimethylimidazolium, 2,4-diethyl-1,3-dimethylimidazolium, 4,5-diethyl-1,3-dimethylimidazolium, 3,4-diethyl-1,2-dimethylimidazolium, 2,3,4-triethyl-1-methyl-imidazolium, 1,2,3-triethyl-4-methylimidazolium, 1,3,4-triethyl-5-methylimidazolium, 1,4,5-triethyl-3-methylimidazolium, 1,2,3,4-tetraethylimidazolium, 1,1-dimethyl-2-heptylimidazolium, 1,1-dimethyl-2-dodecylimidazolium, 1,1-dimethylimidazolium, 1,1,2-trimethylimidazolium, 1,1,2,4-tetramethylimidazolium, 1,2,3,4,5-pentamethylimidazolium and 1,1,2,4,5-pentamethylimidazolium; pyrrolidinium cations such as N,N-dimethylpyrrolidinium cation, N-methyl-N-ethylpyrrolidinium cation and N-methyl-N-propylpyrrolidinium cation; pyridinium cations such as N-methylpyridinium ion, N-ethylpyridinium cation, N-propylpyridinium ion, N-butylpyridinium cation, 1-ethyl-2-methylpyridinium, 1-butyl-4-methylpyridinium and 1-butyl-2,4-dimethylpyridinium; sulfonium cations such as trimethylsulfonium cation, triethylsulfonium cation, tributylsulfonium cation, diethylmethylsulfonium cation, dimethylpropylsulfonium and dimethylhexylsulfonium; and phosphonium cations such as tetramethylphosphonium cation, tetraethylphosphonium cation, tetrapropylphosphonium cation, tetrabutylphosphonium cation, tetraoctylphosphonium cation, tetraphenylphosphonium cation, trimethylethylphosphonium cation, triethylmethylphosphonium cation, hexyltrimethylphosphonium cation and trimethyloctylphosphonium cation.

As anion components for the ambient temperature molten salt there may be mentioned $RO^-$ anions obtained by dissociation of protons of hydroxyl-containing organic compounds such as alcoholates and phenolates; $RS^-$ anions obtained by dissociation of protons of thiolates and thiophenolates; sulfonate anions $RSO_3^-$; carboxylate anions $RCOO^-$; phosphorus-containing derivative anions $R_x(OR)_y(O)_zP^-$ obtained by replacing a portion of the hydroxyl groups of phosphoric acid or phosphorous acid with organic groups (where x, y and z are integers of 0 or greater, and x+y+2z=3 or x+y+2z=5); substituted borate anions $R_x(OR)_yB^-$ (where x and y are integers of 0 or greater, and x+y=4); substituted aluminum anions $R_x(OR)_yAl^-$ (where x and y are integers of 0 or greater, and x+y=4); organic anions such as nitrogen anions $(EA)_2N^-$ and carboanions $(EA)_3C^-$ and inorganic anions such as halide ions and halogen-containing ions. Particularly preferred examples of organic anions include $RSO_3^-$, $RCOO^-$, $(RO_2S)_2N^-$ as a nitrogen anion, and $(RO_2S)_3C^-$ as a carboanion, and preferred examples of inorganic anions include the halogen-containing anions $ClO_4^-$, $BF_4^-$, $AsF_6^-$ and $PF_6^-$, and the halide ions $F^-$, $Cl^-$, $Br^-$ and $I^-$. (Here, R represents hydrogen or a substituted or unsubstituted group selected from the group consisting of alkyl $C_nH_{2n-1}$—, aryl $(Rc)_m-C_6H_{5-m}$—, aralkyl $(Rc)_m-C_6H_{5-m}-C_nH_{2n}$—, alkenyl Rc-CH=CH-Rc—, aralkenyl $(Rc)_m-C_6H_{5-m}-$CH=CH-Rc-, alkoxyalkyl Rc-O—$C_nH_{2n}$— and acyloxyalkyl Rc-COO—$C_nH_{2n}$— groups (where each Rc is a substituted or unsubstituted C20 or lower alkyl group or hydrogen and in the case of multiple groups they may be the same or different, m is an integer of 1-5, and n is an integer of 1-20), and these may have a cyclic structure. They may also contain heteroatoms, and when two or more R groups are present in the molecule, they may be the same or different. EA represents hydrogen or an electron-withdrawing group.) All or a portion of the hydrogens on the R carbons may be replaced with halogen atoms, most preferably with fluorine atoms, and R may also be a halogen atom itself.

The anion component of the ambient temperature molten salt more preferably has at least a fluorosulfonyl group. This will further improve the charge-discharge characteristics of the secondary battery. Such an anion component need only contain a fluorosulfonyl group as a constituent component, and as examples there may be mentioned groups containing fluorosulfonyl groups in anions such as fluorine-containing derivative anions, substituted borate anions, substituted aluminum anions, carboanions and nitrogen anions, among which carboanions and nitrogen anions containing fluorosulfonyl groups are preferred from the viewpoint of electrochemical stability of the ambient temperature molten salt.

Specifically, it is more preferably an anion having a structure represented by any of the following formulas (1)-(5).

$$N(R_1SO_2)(FSO_2)^- \quad (1)$$

$$N(FSO_2)_2^- \quad (2)$$

$$C(R_1SO_2)_2(FSO_2)^- \quad (3)$$

$$C(R_1SO_2)(FSO_2)_2^- \quad (4)$$

$$C(FSO_2)_3^- \quad (5)$$

($R_1$ is a perfluoroalkyl group, and it may have a linear structure, branched structure or cyclic structure.)

A perfluoroalkyl group with any number of carbon atoms in the structure may be used, but since a larger number of carbon atoms may lower the ionic conductance, a perfluoroalkyl group with 1-6 carbon atoms is preferred. The perfluoroalkyl group may have a linear structure, branched structure or cyclic structure, as any such structure will exhibit the same effect.

The slurry for a secondary battery electrode according to the invention preferable further contains an electrode active material as a binder to facilitate immobilization of the electrode active material on the current collector, and an added polymer as a component other than the electrode active material and ambient temperature molten salt. The polymer used in this case may be a known polyvinylidene fluoride or styrene-butadiene based polymer or the like, which polymers are very commonly used as binders. When using a polymer that has been synthesized from monomer components including a salt monomer composed of an onium cation having a polymerizable functional group and an organic anion having a polymerizable functional group, it is especially preferred to use an electrolyte containing the same ambient temperature molten salt as used in the slurry for the secondary battery electrode, in order to increase the affinity between the polymer of the electrode formed using the slurry for the secondary battery electrode and the ambient temperature molten salt in the electrolyte, and to also lower the resistance to ion mobility.

As onium cations with polymerizable functional groups to compose the salt monomer, there may be mentioned cation species such as fluoronium cation ($F^+$), oxonium cation ($O^+$), sulfonium cation ($S^+$), ammonium cation ($N^+$) and phosphonium cation ($P^+$). From the viewpoint of general utility and manageability, phosphonium cation, sulfonium cation and ammonium cation are more preferred, and ammonium cation is most preferred.

As sulfonium cations there may be mentioned, specifically, cations wherein the sulfur atom is substituted with three substituents R. At least one of the three substituents R is a group containing a polymerizable functional group. Examples for the substituents R include substituted or unsubstituted alkyl groups: $C_nH_{2n+1}$, aryl groups: $(R')_n-C_6H_{5-n}-$, aralkyl groups: $(R')_m-C_6H_{5-m}-C_nH_{2n}-$, alkenyl groups: $R'-CH=CH-R'-$, aralkenyl groups: $(R')_n-C_6H_{5-n}-CH=CH-R'-$, alkoxyalkyl groups: $R'-O-C_nH_{2n}-$, acyloxyalkyl groups: $R'-COO-C_nH_{2n}-$, and the like. The substituents R may also contain heteroatoms or halogen atoms. Also, the three R groups may be different or identical groups. R' among the substituents R of the sulfonium cation is hydrogen or a substituted or unsubstituted C20 or lower alkyl group, and in the case of multiple groups, they may be different groups, with m an integer of 1-5 and n an integer of 1-20. As substituents when R and R' are substituted, there may be mentioned straight-chain or branched alkyl groups such as methyl, ethyl, n-propyl, isopropyl, n-butyl, isobutyl, sec-butyl, tert-butyl, n-pentyl, neopentyl, n-hexyl, n-heptyl, n-octyl, n-nonyl and n-decyl, cyclic alkyl groups such as cyclohexyl and 4-methylcyclohexyl, straight-chain or branched alkoxy groups such as methoxy, ethoxy, n-propoxy, isopropoxy, n-butoxy, isobutoxy, sec-butoxy, tert-butoxy and n-hexyloxy, cyclic alkoxy groups such as cyclohexyloxy, alkoxyalkoxy groups such as methoxymethoxy, methoxyethoxy, ethoxyethoxy, methoxypropoxy, ethoxypropoxy and propoxypropoxy, aryl groups such as phenyl, p-tolyl, m-tolyl, o-tolyl, p-chlorophenyl, m-chlorophenyl and o-chlorophenyl, aryloxy groups such as phenoxy, m-methylphenoxy, o-methylphenoxy, p-chlorophenoxy, m-chlorophenoxy, o-chlorophenoxy and p-n-butylphenoxy, arylthio groups such as phenylthio, p-methylphenylthio, m-methylphenylthio, o-methylphenylthio, o-ethylphenylthio, p-propylphenylthio and 2,4,6-trimethylphenylthio, alkylcarbonylamino groups such as methylcarbonylamino, ethylcarbonylamino, n-propylcarbonylamino, isopropylcarbonylamino and n-butylcarbonylamino, alkoxycarbonylamino groups such as methoxycarbonylamino, ethoxycarbonylamino, n-propoxycarbonylamino, isopropoxycarbonylamino and n-butoxycarbonylamino, alkylcarbonyl groups such as methylcarbonyl, ethylcarbonyl, n-propylcarbonyl, isopropylcarbonyl and n-butylcarbonyl, alkylcarboxy groups such as methylcarboxy, ethylcarboxy, n-propylcarboxy, isopropylcarboxy and n-butylcarboxy, alkoxycarboxy groups such as methoxycarboxy, ethoxycarboxy, n-propoxycarboxy, isopropoxycarboxy and n-butoxycarboxy, and alkoxycarbonylalkoxy groups such as methoxycarbonylmethoxy, ethoxycarbonylethoxy, ethoxycarbonylmethoxy, n-propoxycarbonylmethoxy, isopropoxycarbonylmethoxy and n-butoxycarbonylmethoxy, which substituents may also contain halogen atoms or heteroatoms. There may also be mentioned as substituents cyano, and halogen atoms such as fluorine, chlorine and bromine.

As phosphonium cations there may be mentioned, specifically, cations wherein the phosphorus atom is substituted with four substituents R. At least one of the four substituents R is a group containing a polymerizable functional group. Examples for the substituents R include substituted or unsubstituted alkyl groups: $C_nH_{2n+1}$, aryl groups: $(R')_n-C_6H_{5-n}-$, aralkyl groups: $(R')_m-C_6H_{5-m}-C_nH_{2n}-$, alkenyl groups: $R'-CH=CH-R'-$, aralkenyl groups: $(R')_n-C_6H_{5-n}-CH=CH-R'-$, alkoxyalkyl groups: $R'-O-C_nH_{2n}-$, acyloxyalkyl groups: $R'-COO-C_nH_{2n}-$, and the like. The substituents R may also contain heteroatoms or halogen atoms. Also, the four R groups may be different or identical groups. R' among the substituents R of the phosphonium cation is hydrogen or a substituted or unsubstituted C20 or lower alkyl group, and in the case of multiple groups, they may be different groups, with m an integer of 1-5 and n an integer of 1-20. As substituents when R and R' are substituted, there may be mentioned the same ones as for sulfonium cations.

Ammonium cations are cations derived from amine compounds, amine compounds naturally including all amine compounds such as aliphatic amine compounds, aromatic amine compounds and nitrogen-containing heterocyclic amine compounds, and they are not particularly restricted so long as they have a positive electrical charge and are produced from an amine. Specifically, there may be mentioned cations wherein the nitrogen atom is substituted with four substituents R. At least one of the four functional groups R is a group containing a polymerizable functional group. Examples for the substituents R include substituted or unsubstituted alkyl groups: $C_nH_{2n+1}$, aryl groups: $(R')_n-C_6H_{5-n}-$, aralkyl groups: $(R')_m-C_6H_{5-m}-C_nH_{2n}-$, alkenyl groups: $R'-CH=CH-R'-$, aralkenyl groups: $(R')_n-C_6H_{5-n}-CH=CH-R'-$, alkoxyalkyl groups: $R'-O-C_nH_{2n}-$, acyloxyalkyl groups: $R'-COO-C_nH_{2n}-$, and the like. The substituents R may also contain heteroatoms or halogen atoms. The four R groups may be different or identical groups. R' among the substituents R of the ammonium cation is hydrogen or a substituted or unsubstituted C20 or lower alkyl group, and in the case of multiple groups, they may be different groups, with m an integer of 1-5 and n an integer of 1-20. As substituents when R and R' are substituted, there may be mentioned the same ones as for sulfonium cations.

Ammonium cations other than the ammonium cations mentioned above include aromatic ammonium cations such as pyridinium cation, pyrralidinium cation, and quinolinium cation, aliphatic heterocyclic ammonium cations such as pyrrolidium cation, piperidinium cation and piperadinium cation, heterocyclic ammonium cations containing heteroatoms other than nitrogen, such as morpholine cation, and unsaturated nitrogen-containing heterocyclic cations such as imidazolium cation. The aforementioned cyclic ammonium cations may also be cations with different nitrogen positions, cations with substituents on the ring, or cations with heteroatom-containing substituents.

There are no restrictions whatsoever on the polymerizable functional groups for the onium cation, so long as they are functional groups which allow polymerization by radical polymerization, ion polymerization, coordination polymerization, redox polymerization or the like, but groups with carbon-carbon double bonds are preferred, and radical-polymerizing functional groups are more preferred. As radical-polymerizing functional groups there are more preferred groups that allow radical polymerization by an active energy beam or heat. As examples of such functional groups there may be mentioned (meth)acryloyl, (meth)acryloyloxy, (meth)acrylamide, allyl, vinyl and styryl, among which (meth)acryloyloxy, (meth)acrylamide, styryl, allyl and vinyl are preferred.

As specific examples of onium cations with polymerizable functional groups for the salt monomer there may be mentioned ammonium cations such as (meth)acryloyloxyethyltrimethylammonium cation, (meth)acryloyloxyethyltriethylammonium cation, (meth)acryloyloxyethyltri-n-propylammonium cation, (meth)acryloyloxyethyltri-iso-propylammonium cation, (meth)acryloyloxyethyltri-n-butylammonium cation, (meth)acryloyloxyethyltri-iso-butylammonium cation, (meth)acryloyloxyethyltri-tert-butylammonium cation, (meth)acryloyloxyethyltriethylammonium cation, (meth)acryloyloxyethyldiethyl-n-hexylammonium cation, (meth)acryloyloxyethyltridecylammonium cation, (meth)acryloyloxyethyltrioctylammonium cation, (meth)acryloyloxyethyldodecyldimethylammonium cation, (meth)acryloyloxyethyldimethylbenzylammonium cation, (meth)acryloyloxyethyldodecylhexylmethylammonium cation, diallyldimethylammonium cation, bisstyrylmethyldimethylammonium cation, bisstyrylethyldimethylammonium cation, (meth)acrylamidoethyltrimethylammonium cation, (meth)acrylamidepropyltrimethylammonium cation, (meth)acrylamidoethyltriethylammonium cation, (meth)acrylamidoethyltri-n-propylammonium cation, (meth)acrylamidoethyltri-iso-propylammonium cation, (meth)acrylamidoethyltri-n-butylammonium cation, (meth)acrylamidoethyltri-iso-butylammonium cation, (meth)acrylamidoethyltri-tert-butylammonium cation, (meth)acrylamidoethyltriethylammonium cation, (meth)acrylamidoethyldiethyl-n-hexylammonium cation, (meth)acrylamidoethyltridecylammonium cation, (meth)acrylamidoethyltrioctylammonium cation, (meth)acrylamidoethyldodecyldimethylammonium cation and (meth)acrylamidoethyldodecylhexylmethylammonium cation, as well as cyclic ammonium cations such as styrylmethylmethylpyrrolidinium cation, bisstyrylmethylpiperidinium cation, N,N'-((meth)acryloyloxyethylmethyl)piperadinium cation, (meth)acrylamidoethylmethylmorpholinium cation and (meth)acryloyloxyethylmethylimidazolium cation.

There are no particular restrictions on organic anions for the salt monomer used for the invention so long as they are organic anions with polymerizable functional groups, and as examples there may be mentioned RO$^-$ anions obtained by dissociation of protons of hydroxyl-containing organic compounds such as alcoholates and phenolates; RS$^-$ anions obtained by dissociation of protons of thiolates and thiophenolates; sulfonate anions: RSO$_3^-$, carboxylate anions: RCOO$^-$; phosphorus-containing derivative anions: R$_x$(OR)$_y$(O)$_z$P$^-$ obtained by replacing a portion of the hydroxyl groups of phosphoric acid or phosphorous acid with organic groups (where x, y and z are integers of 0 or greater, and x+y+2z=3 or x+y+2z=5); substituted borate anions: R$_x$(OR)$_y$B$^-$ (where x and y are integers of 0 or greater, and x+y=4); substituted aluminum anions: R$_x$(OR)$_y$Al$^-$ (where x and y are integers of 0 or greater, and x+y=4); carboanions (EA)$_3$C$^-$, nitrogen anions (EA)$_2$N$^-$, and the like. Each EA represents hydrogen or an electron-withdrawing group.

Particularly preferred as organic anions are anions derived from sulfoxyl, carboxyl, phosphoxyl and sulfonimide groups, such as RSO$_3^-$, RCOO$^-$, RPO$_3^{2-}$ and (RO$_2$S)$_2$N$^-$. R in these organic anions is hydrogen or a substituted or unsubstituted alkyl C$_n$H$_{2n+1}$, aryl (R')$_n$—C$_6$H$_{5-n}$—, aralkyl (R')$_m$—C$_6$H$_{5-m}$—C$_n$H$_{2n}$—, alkenyl R'—CH=CH—R'—, aralkenyl (R')$_n$—C$_6$H$_{5-n}$—CH=CH—R'—, alkoxyalkyl R'—O—C$_n$H$_{2n}$— or acyloxyalkyl R'—COO—C$_n$H$_{2n}$— group, and may have a cyclic structure and may contain a heteroatom. When two or more R groups are present in the molecule, they may be the same or different. However, for an anion with one substituent R where the R has multiple substituents R, at least one thereof is a group containing a polymerizable functional group, and similarly for an anion with one substituent EA where the EA has multiple substituents EA, at least one thereof is a group containing a polymerizable functional group. R' among the substituents R is hydrogen or a substituted or unsubstituted C20 or lower alkyl group, and in the case of multiple groups, they may be different groups, with m an integer of 1-5 and n an integer of 1-20. This also includes cases where all or a portion of the hydrogens on the carbons of R are replaced with halogen atoms. As substituents when R and R' are substituted there may be mentioned the same ones as for sulfonium cations.

As polymerizable functional groups for the organic anion there may be mentioned the same ones as for the onium cations with polymerizable functional groups. The salt monomer therefore has at least two polymerizable functional groups, and the polymerizable functional groups may be the same or different.

As specific examples of organic anions having polymerizable functional groups, composing the salt monomer, there may be mentioned anions derived from organic acids such as 2-acrylamide-2-methyl-1-propanesulfonic acid, 2-[(2-propenyloxy)methoxy]ethenesulfonic acid, 3-(2-propenyloxy)-1-propene-1-sulfonic acid, vinylsulfonic acid, 2-vinylbenzenesulfonic acid, 3-vinylbenzenesulfonic acid, 4-vinylbenzenesulfonic acid, 4-vinylbenzylsulfonic acid, 2-methyl-1-pentene-1-sulfonic acid, 1-octene-1-sulfonic acid, 4-vinylbenzenemethanesulfonic acid, acrylic acid, methacrylic acid, 2-acrylamide-2-methyl-1-propanephosphoric acid and 2-(meth)acryloyloxy-1-ethanephosphoric acid.

The salt monomer composed of an onium cation having a polymerizable functional group and an organic anion having a polymerizable functional group, which is used for the invention, may be synthesized by, for example, reacting a metal salt such as a silver salt of an organic anion having a polymerizable functional group, with a halide of an onium cation having a polymerizable functional group, but the method of synthesis is not restricted so long as it yields the target salt monomer.

One example of a method used to synthesize a polymer by polymerization of the salt monomer is a method in which the salt monomer is dissolved in an organic solvent such as methanol or acetonitrile, with addition of a radical polymerization initiator if necessary, and the solution is heated, exposed to visible or ultraviolet light, or irradiated with radiation such as an electron beam, for polymerization, which method will yield the desired polymer.

When heating is employed for polymerization of the salt monomer, azo-based polymerization initiators such as 2,2'-azobisisobutyronitrile, 2,2'-azobis(2-isobutyronitrile) and 2,2'-azobis(2,4-dimethylvaleronitrile) and peroxide-based polymerization initiators such as benzoyl peroxide, dicumyl peroxide and diisopropylperoxy carbonate may be mentioned as radical polymerization initiators, and the polymerization method may involve heating at 30-150° C., for example. When irradiation with light is employed, acetophenone, benzophenone, 2,2-dimethoxy-2-phenylacetophenone and the like may be used as radical polymerization initiators. The radical polymerization initiator, when used, is added in an amount of preferably about 0.01 mmol %-30 mol % and even more preferably 0.1 mmol %-20 mol %, with respect to the number of moles of polymerizable functional groups among all the components in the polymerization system.

Other monomers may also be used as monomer components in addition to the salt monomer, for synthesis of the polymer for the invention. They may be used in combination in the form of a copolymer of the salt monomer with the other monomers, or the other monomers may be polymerized alone and used therewith as polymers. As examples of other monomers there may be mentioned monomers with multiple polymerizable functional groups, such as methylenebisacrylamide, ethyleneglycol di(meth)acrylate, divinylbenzene, diallylmethylamine, diallylethylamine, trimethylolpropane triacrylate, tetramethylolmethane tetraacrylate and diallyl phthalate, and monomers with one polymerizable functional group such as N,N-dimethyl(meth)acrylamide, N-isopropyl (meth)acrylamide, stearyl acrylate, diacetoneacrylamide, 1-adamantyl(meth)acrylate and 2-ethyladamantyl(meth) acrylate.

The slurry for a secondary battery electrode according to the invention may further contain an added lithium salt from the viewpoint of facilitating uniform diffusion of the lithium salt of the electrolyte of the secondary battery throughout the electrode active material. As such lithium salts there may be mentioned the same lithium salts to be used as electrolytes, and examples include $LiPF_6$, $LiClO_4$, $LiCF_3SO_3$, $LiBF_4$, $LiAsF_6$, $LiN(CF_3SO_2)_2$, $LiN(C_2F_5SO_2)_2$ and $LiC(CF_3SO_2)_3$, or ambient temperature molten salts containing Li ion as the cation component (for example, the lithium salts mentioned in Japanese Unexamined Patent Publication No. 2004-307481), any of which may be used alone or in mixtures of two or more.

The slurry for a secondary battery electrode according to the invention preferably further contains an organic solvent. More typically, when the slurry for a secondary battery electrode also contains a polymer, an organic solvent capable of dissolving the polymer may be used together therewith in order to improve the solubility of the polymer. An organic solvent may also be added to the slurry for a secondary battery electrode, to improve the uniformity of the slurry. Polar solvents are preferred as such organic solvents, and N-methylpyrrolidone may be mentioned as a common one. One or more solvents such as methanol or acetonitrile may also be added to the N-methylpyrrolidone, or used alone; however, the organic solvent is not limited to the solvents mentioned here.

The process for production of the slurry for a secondary battery electrode according to the invention may be a method in which the slurry for a secondary battery electrode is obtained using electrode active materials and an ambient temperature molten salt, with a conductive agent such as graphite if necessary, and prescribed amounts of other optional components such as polymers, lithium salts, and organic solvents are mixed therewith.

Specifically, the slurry for a secondary battery electrode for the positive electrode may be obtained, for example, by mixing together the positive electrode active material, conductive agent and optional polymers and organic solvents, and then combining this mixture with the ambient temperature molten salt and dispersing the obtained mixture. The mixture of the components is not restricted to this order.

The proportion of positive electrode active material in the slurry for a secondary battery electrode for the positive electrode is preferably no higher than 99.9 wt % and more preferably no higher than 99.5 wt %, and also preferably no lower than 70 wt % and more preferably no lower than 75 wt %. The proportion of the ambient temperature molten salt in the slurry for a secondary battery electrode for the positive electrode is preferably no higher than 30 wt % and more preferably no higher than 25 wt %, and also preferably no lower than 0.1 wt % and more preferably no lower than 0.5 wt %.

The proportion of the components used in addition to the electrode active materials and ambient temperature molten salt, specifically for a conductive agent, is preferably no higher than 30 wt % and more preferably no higher than 20 wt %, and also preferably no lower than 0.1 wt % and more preferably no lower than 1 wt %, with respect to the total of the electrode active materials and ambient temperature molten salt. The proportion of polymers is preferably no higher than 30 wt % and more preferably no higher than 20 wt %, and also preferably no lower than 0.1 wt % and more preferably no lower than 0.5 wt %, with respect to the total of the electrode active materials and ambient temperature molten salt. The proportion of lithium salt is preferably no higher than 15 wt % and more preferably no higher than 10 wt %, and also preferably no lower than 0.1 wt % and more preferably no lower than 0.5 wt %, with respect to the total of the electrode active materials and ambient temperature molten salt. The proportion of organic solvent is, for example, preferably no higher than 100 parts by weight and more preferably no higher than 50 parts by weight, and also preferably no lower than 0.01 part by weight and more preferably no lower than 0.1 part by weight, with respect to the total of the components other than the organic solvent in the slurry for a secondary battery electrode. The proportion of organic solvent may be within the aforementioned range in an amount sufficient to improve the solubility of the polymer and the uniformity of the slurry for a secondary battery electrode, but if it exceeds the suitable range, the active material layer may become non-uniform due to formation of gaps during removal of the organic solvent, at the sites where the organic solvent was present.

The slurry for a secondary battery electrode for the negative electrode may be obtained, for example, by mixing the negative electrode active material and optional polymers and organic solvents, and combining this mixture with the ambient temperature molten salt and dispersing the obtained mixture. If necessary, a conductive agent may also be used as the positive electrode. The mixture of the components is not restricted to this order, incidentally.

The proportion of negative electrode active material in the slurry for a secondary battery electrode for the negative electrode is preferably no higher than 99.9 wt % and more preferably no higher than 99.5 wt %, and also preferably no lower than 70 wt % and more preferably no lower than 75 wt %. The proportion of the ambient temperature molten salt in the slurry for a secondary battery electrode for the negative electrode is preferably no higher than 30 wt % and more preferably no higher than 25 wt %, and also preferably no lower than 0.1 wt % and more preferably no lower than 0.5 wt %.

The proportion of the components used in addition to the electrode active materials and ambient temperature molten salt, specifically for polymers, is preferably no higher than 30 wt % and more preferably no higher than 20 wt %, and also preferably no lower than 0.1 wt % and more preferably no lower than 0.5 wt %, with respect to the total of the electrode active materials and ambient temperature molten salt. The proportion of lithium salt is preferably no higher than 15 wt % and more preferably no higher than 10 wt %, and also preferably no lower than 0.1 wt % and more preferably no lower than 0.5 wt %, with respect to the total of the electrode active materials and ambient temperature molten salt. The proportion of organic solvent is, for example, preferably no higher than 100 parts by weight and more preferably no higher than 50 parts by weight, and also preferably no lower than 0.01 part by weight and more preferably no lower than 0.1 part by weight, with respect to the total (1 part by weight) of the components other than the organic solvent in the slurry for a secondary battery electrode. The proportion of organic solvent may be within the aforementioned range in an amount sufficient to improve the solubility of the polymer and the uniformity of the slurry for a secondary battery electrode, but if it exceeds the suitable range, the active material layer may become non-uniform due to formation of gaps during removal of the organic solvent, at the sites where the organic solvent was present.

The electrode for a secondary battery according to the invention comprises a current collector and an electrode active material layer. The electrode active material layer may be formed by coating the current collector with the slurry for a secondary battery electrode according to the invention. The current collector may employ an aluminum foil, for example, as the positive electrode and a copper foil, for example, as the negative electrode.

The process for production of an electrode for a secondary battery according to the invention may be a method that comprises coating a prescribed location of a current collector metal foil with the slurry for a secondary battery electrode according to the invention to form a coated film on the current collector metal foil, and using the coated film as the electrode active material layer. The current collector metal foil is the current collector for the secondary battery electrode. Here, the coated film is preferably heated to improve the flow property and then cooled, in order to immobilize the electrode active material in the secondary battery electrode slurry on the current collector metal foil. The temperature for heating in such heating fluidization may be, for example, about 50-200° C. The heating fluidization step may be omitted when an organic solvent is used in the secondary battery electrode slurry, but typically the organic solvent will be removed by drying.

Similar to the current collector as mentioned above, the current collector metal foil may employ an aluminum foil or the like as the positive electrode and a copper foil or the like as the negative electrode.

As a specific example of a process for production of the electrode for a secondary battery, there may be mentioned a process in which, for the positive electrode, the secondary battery electrode slurry is evenly coated onto a prescribed location of an aluminum foil with a thickness of about 20 μm as the current collector metal foil using a printing method or a dispenser to form a coated film, and then the coated film is dried and compression molded with a roll press or the like. The thickness of the aluminum foil is merely an example and is not intended to be restrictive. The thickness of the obtained electrode is preferably between 21 μm and 200 μm and more preferably between 23 μm and 150 μm, but this is not restrictive.

As a process for production of the negative electrode, there may be mentioned a process in which the secondary battery electrode slurry is evenly coated onto prescribed locations on both sides of a copper foil with a thickness of about 15 μm as the current collector metal foil using a printing method or a dispenser, to form a coated film, and then the coated film is dried and compression molded with a roll press or the like. The thickness of the copper foil is merely an example and is not intended to be restrictive. The thickness of the obtained electrode is preferably between 16 μm and 200 μm and more preferably between 18 μm and 150 μm, but this is not restrictive.

The secondary battery of the invention comprises a positive electrode and negative electrode, and an electrolyte. The secondary battery also includes a separator to prevent shorting between the positive electrode and negative electrode. When the electrolyte is a solid electrolyte containing a conjugating polymer, the electrolyte can also serve as the separator so long as it can perform the function of a separator. Either one or both of the positive electrode and negative electrode in the secondary battery of the invention are electrodes for a secondary battery according to the invention, obtained in the manner described above.

The electrolyte of the secondary battery of the invention will typically contain a lithium salt as an essential component, and also a polymer, ambient temperature molten salt, plasticizer, flame retardant electrolyte salt solubilizer and other additives. It is particularly preferred to use an electrolyte that contains an ambient temperature molten salt composed of a cation component and an anion component, since the charge-discharge characteristics of the secondary battery will be more favorable. The anion component of the ambient temperature molten salt more preferably has a fluorosulfonyl group for more satisfactory charge-discharge characteristics.

As lithium salts for the electrolyte there may be mentioned the same lithium salts used in the slurry for a secondary battery electrode. When the electrolyte contains other components, the lithium salt content in the electrolyte is preferably no lower than 0.1 wt % and no higher than 89.9 wt %, and more preferably no lower than 1 wt % and no higher than 79 wt %.

Typically, the components other than the lithium salt in the electrolyte may be added in amounts such that the lithium salt concentration of the electrolyte is within the range specified above.

The polymer used in the electrolyte may be, for example, the same polymer used in the slurry for the secondary battery electrode, but it is not particularly restricted so long as the electrolyte containing the polymer is electrochemically stable and has high ionic conductance. The polymer content as an electrolyte is preferably no lower than 0.1 wt % and no higher than 50 wt %, and more preferably no lower than 1 wt % and no higher than 40 wt %.

The separator is not particularly restricted so long as it prevents shorting between the positive electrode and negative electrode used in the secondary battery, but it is preferably electrochemically stable. As specific examples there may be mentioned polyethylene separators, polypropylene separators, cellulose separators, nonwoven fabrics, inorganic separators and glass filters.

When the solid electrolyte contains a polymer for conjugation with the electrolyte, the polymer may be any one that can conjugate with the electrolyte, and acrylate-based polymers, polyvinylidene fluoride or the like may be used. More preferably, the polymer is a polymer synthesized from monomer components including a salt monomer composed of an onium cation having a polymerizable functional group and an organic anion having a polymerizable functional group, because the electrolyte will exhibit more excellent ionic conductance and satisfactory charge-discharge characteristics will be obtained for the secondary battery. As specific examples of polymers synthesized from monomer components that include salt monomers, there may be mentioned the same ones used for fabrication of the electrode for the secondary battery.

As ambient temperature molten salts to be used in the electrolyte, there may be mentioned the same ambient temperature molten salts to be used for the secondary battery electrode slurry. Electrolytes containing ambient temperature molten salts generally have high viscosity and poor penetration into electrodes. However, by using the slurry for a secondary battery electrode according to the invention in combination with an electrode that already contains an ambient temperature molten salt, it is possible to obtain a secondary battery having low ion mobility resistance between the electrode and electrolyte, and satisfactory charge-discharge characteristics, even when such electrolytes are used.

As examples of plasticizers there may be mentioned cyclic carbonic acid esters such as ethylene carbonate and propylene carbonate, or linear carbonic acid esters such as ethylmethyl carbonate and diethyl carbonate, and mixtures of two or more of the foregoing may also be used.

As flame retardant electrolyte salt solubilizers there may be mentioned compounds that are self-extinguishing and contribute to dissolution of the electrolyte salt when in the copresence of the electrolyte salt, and specifically there may be mentioned phosphoric acid esters, halogenated compounds and phosphazene.

An example of a method for preparation of the electrolyte is a method in which the lithium salt is dissolved in the ambient temperature molten salt. For improved solubility of the electrolyte components, or when a polymer is also used, the electrolyte may be obtained by using an organic solvent to prepare a solution containing the electrolyte components, and then heating it to remove the organic solvent. When the polymer has been synthesized from monomer components including the same salt monomer as the polymer for the secondary battery electrode slurry, the organic solvent may be an alcohol, acetonitrile or the like. Other additives may also be added in this case.

The process for production of a secondary battery according to the invention may be a known process, and as an example, first the positive electrode and negative electrode are cut to the prescribed shapes and sizes and the prepared positive electrode and negative electrode are then attached via a separator to produce a monolayer cell. Next, the electrolyte is injected between the electrodes of the monolayer cell by a method such as filling. Alternatively, the monolayer cell may be obtained by dipping the electrodes and separator in the electrolyte beforehand and stacking them. The cell obtained in this manner may be inserted in an exterior composed of a laminate film with the three-layer structure: polyester film-aluminum film-modified polyolefin film, and sealed to obtain a secondary battery. When the separator is produced using a polymer synthesized from monomer components including a salt monomer, it is possible to use a mixture of the polymer, lithium salt and ambient temperature molten salt, but from the viewpoint of improving manageability, the mixture may be diluted with a low boiling point diluting solvent such as tetrahydrofuran, methanol or acetonitrile, in which case the diluting solvent may be subsequently removed.

EXAMPLES

The present invention will now be described in greater detail by examples, with the understanding that the invention is not limited thereto in any way.

Example 1

Synthesis and Polymerization of Salt Monomer

After dissolving 10.36 g (50 mmol) of 2-acrylamide-2-methyl-1-propanesulfonic acid in 500 ml methanol/4 ml distilled water, 8.28 g (30 mmol) of silver carbonate was added thereto and the mixture was gently stirred continuously for 4 hours at room temperature and then filtered to obtain a colorless transparent solution. To the filtrate there was added dropwise a solution of 101 mmol acryloyloxyethyldimethylbenzylammonium chloride in 100 ml of methanol, for reaction. The reaction proceeded in a quantitative manner. The silver chloride reaction product was filtered out and a colorless transparent methanol solution was recovered. The filtrate was concentrated under reduced pressure with an evaporator and allowed to stand in a cool dark space for a whole day for recrystallization of the target substance, and colorless transparent laminar crystals were recovered. The obtained product was confirmed by $^1$H-NMR to be the target compound (salt monomer of 2-acrylamide-2-methyl-1-propanesulfonate anion and acryloyloxyethyldimethylbenzylammonium cation).

Next, 10 g of this salt monomer was dissolved in 30 ml of methanol, 0.03 g of benzoyl peroxide was added as a polymerization initiator and the mixture was thoroughly deaerated, and then thermal polymerization was carried out for 60 minutes under a nitrogen stream at 60° C. The reaction mixture increased in viscosity as polymerization proceeded. When the obtained reaction mixture was added dropwise into 1500 ml of acetone, a white solid precipitated. This was filtered and dried under reduced pressure at 60° C. for 2 hours, and 6.5 g of a salt monomer polymer (polymer (1)) was recovered.

<Fabrication of Negative Electrode>

In this fabrication 90 wt % of natural graphite as the negative electrode active material, 3 wt % of the previously obtained polymer (1) as the binder, 5 wt % of N-methyl-N-propyl-pyrrolidinium/bis(fluorosulfonyl)imide as the ambient temperature molten salt and 2 wt % of $LiN(CF_3SO_2)_2$ as the lithium salt to prepare a negative electrode mixture, and the negative electrode mixture was dispersed in N-methyl-2-pyrrolidone as the organic solvent were combined to prepare a slurry for a secondary battery electrode. The slurry was evenly coated onto a 15 μm-thick copper foil used as the negative electrode current collector, and after drying, it was subjected to compression molding with a roll press to obtain negative electrode (1) with a thickness of approximately 70 μm.

<Fabrication of Evaluation Cell Using Negative Electrode>

The previously obtained negative electrode (1) was used with metal lithium as the counter electrode, a polyethylene separator as the separator, and a mixture of N-methyl-N-propyl-pyrrolidinium/bis(fluorosulfonyl)imide and LiN($CF_3SO_2$) (mixing ratio: 80 wt %/20 wt %) as the electrolyte, to fabricate a cell for evaluation of the charge-discharge characteristics.

<Evaluation of Charge-Discharge Characteristics with Negative Electrode>

The charge-discharge characteristics of the previously obtained cell were evaluated using a charge-discharge characteristic evaluator (HJR-1010 mSM8, product of Hokuto Denko Corp.) at a current density of 0.1C (where C represents the discharge rate) mA, a maximum voltage of 2.5 V and a minimum voltage of 0 V, at 25° C. under an argon atmosphere. The initial charge capacity obtained by the evaluation was 313 mAh/g, and the charge-discharge efficiency (initial charge capacity/initial discharge capacity) was 85%.

Example 2

Negative electrode (2) was obtained by the same method as Example 1, except for using 90 wt % of natural graphite, 5 wt % of polymer (1), 3 wt % of N-methyl-N-propyl-pyrrolidinium/bis(fluorosulfonyl)imide and 2 wt % of LiN($CF_3SO_2$)$_2$ in the procedure for fabrication of the negative electrode of Example 1.

When negative electrode (2) was used to fabricate a cell and the charge-discharge characteristics of the cell were evaluated in the same manner as Example 1, the initial charge capacity was 308 mAh/g and the charge-discharge efficiency was 84%.

Example 3

Negative electrode (3) was obtained by the same method as Example 1, except for using 90 wt % of natural graphite, 1 wt % of polymer (1), 8 wt % of N-methyl-N-propyl-pyrrolidinium/bis(fluorosulfonyl)imide and 1 wt % of LiN($CF_3SO_2$)$_2$ in the procedure for fabrication of the negative electrode of Example 1.

When negative electrode (3) was used to fabricate a cell and the charge-discharge characteristics of the cell were evaluated in the same manner as Example 1, the initial charge capacity was 298 mAh/g and the charge-discharge efficiency was 82%.

Example 4

Negative electrode (4) was obtained by the same method as Example 1, except for using 90 wt % of natural graphite, 4 wt % of polymer (1) and 6 wt % of N-methyl-N-propyl-pyrrolidinium/bis(fluorosulfonyl)imide in the procedure for fabrication of the negative electrode of Example 1.

When negative electrode (4) was used to fabricate a cell and the charge-discharge characteristics of the cell were evaluated in the same manner as Example 1, the initial charge capacity was 305 mAh/g and the charge-discharge efficiency was 82%.

Example 5

Negative electrode (5) was obtained by the same method as Example 1, except for using 87 wt % of natural graphite, 9 wt % of polyvinylidene fluoride as the binder polymer, 3 wt % of N-methyl-N-propyl-pyrrolidinium/bis(fluorosulfonyl)imide and 1 wt % of LiN($CF_3SO_2$)$_2$ in the procedure for fabrication of the negative electrode of Example 1.

When negative electrode (5) was used to fabricate a cell and the charge-discharge characteristics of the cell were evaluated in the same manner as Example 1, the initial charge capacity was 309 mAh/g and the charge-discharge efficiency was 85%.

Example 6

Negative electrode (6) was obtained by the same method as Example 1, except for using 90 wt % of phenol resin-based carbon (nitrogen-containing carbon material) obtained by carbonization of PR-217 by Sumitomo Bakelite Co., Ltd. as the negative electrode active material instead of natural graphite, 3 wt % of polymer (1), 5 wt % of N-methyl-N-propyl-pyrrolidinium/bis(fluorosulfonyl)imide and 2 wt % of LiN($CF_3SO_2$)$_2$ in the procedure for fabrication of the negative electrode of Example 1.

Negative electrode (6) was used to fabricate a cell in the same manner as Example 1, and when the charge-discharge characteristics were evaluated at a current value at which the current level per unit active material was equal to Example 1, the initial charge capacity was 486 mAh/g and the charge-discharge efficiency was 81%.

Example 7

Negative electrode (7) was obtained by the same method as Example 1, except for using 90 wt % of phenol resin-based carbon (nitrogen-free carbon material) obtained by carbonization of PR-50731 by Sumitomo Bakelite Co., Ltd. as the negative electrode active material instead of natural graphite, 3 wt % of polymer (1), 5 wt % of N-methyl-N-propyl-pyrrolidinium/bis(fluorosulfonyl)imide and 2 wt % of LiN($CF_3SO_2$)$_2$ in the procedure for fabrication of the negative electrode of Example 1.

Negative electrode (7) was used to fabricate a cell in the same manner as Example 1, and when the charge-discharge characteristics were evaluated at a current value at which the current level per unit active material was equal to Example 1, the initial charge capacity was 449 mAh/g and the charge-discharge efficiency was 81%.

Example 8

Negative electrode (8) was obtained by the same method as Example 1, except for using 90 wt % of natural graphite, 3 wt % of polymer (1), 5 wt % 1-ethyl-3-methylimidazolium/bis (fluorosulfonyl)imide instead of N-methyl-N-propyl-pyrrolidinium/bis(fluorosulfonyl)imide as the ambient temperature molten salt and 2 wt % of LiN($CF_3SO_2$)$_2$ in the procedure for fabrication of the negative electrode of Example 1.

When negative electrode (8) was used to fabricate a cell and the charge-discharge characteristics of the cell were evaluated in the same manner as Example 1, the initial charge capacity was 305 mAh/g and the charge-discharge efficiency was 83%.

Example 9

In this example 87 wt % of natural graphite as the negative electrode active material, 2 wt % of polymer (1), 10 wt % of N-methyl-N-propyl-pyrrolidinium/bis(fluorosulfonyl)imide and 1 wt % of LiN($CF_3SO_2$)$_2$, and the mixture was stirred while heating at 120° C. were combined to prepare a negative electrode mixture, from which a slurry for a secondary battery electrode was prepared. The slurry was heated to 120° C. and evenly coated onto a 15 μm-thick copper foil used as the negative electrode current collector, and after cooling, it was subjected to compression molding with a roll press to obtain negative electrode (9).

When negative electrode (9) was used to fabricate a cell and the charge-discharge characteristics of the cell were evaluated in the same manner as Example 1, the initial charge capacity was 295 mAh/g and the charge-discharge efficiency was 81%.

Example 10

Fabrication of Positive Electrode

In this example 85 wt % of $LiCoO_2$ as the positive electrode active material, 5 wt % of graphite as a conductive agent, 3 wt % of the previously obtained polymer (1) as the binder, 5 wt % of N-methyl-N-propyl-pyrrolidinium/bis(fluorosulfonyl)imide as the ambient temperature molten salt and 2 wt % of $LiN(CF_3SO_2)_2$ as the lithium salt were combined to prepare a positive electrode mixture, and the positive electrode mixture was dispersed in N-methyl-2-pyrrolidone as the organic solvent to prepare a slurry for a secondary battery electrode. The slurry was evenly coated onto a 20 μm-thick aluminum foil used as the positive electrode current collector, and after drying, it was subjected to compression molding with a roll press to obtain positive electrode (1).

<Fabrication of Evaluation Cell Using Positive Electrode>

The previously obtained positive electrode (1) was used with metal lithium as the counter electrode, a polyethylene separator as the separator, and a mixture of N-methyl-N-propyl-pyrrolidinium/bis(fluorosulfonyl)imide and $LiN(CF_3SO_2)$ (mixing ratio: 80 wt %/20 wt %) as the electrolyte, to fabricate a cell for evaluation of the charge-discharge characteristics.

<Evaluation of Charge-Discharge Characteristics with Positive Electrode>

The charge-discharge characteristics of the previously obtained cell were evaluated using a charge-discharge characteristic evaluator (HJR-1010 mSM8, product of Hokuto Denko Corp.) at a current density of 0.1C (where C represents the discharge rate) mA, a maximum voltage of 4.3 V and a minimum voltage of 3.0 V, at 25° C. under an argon atmosphere. The initial charge capacity obtained by the evaluation was 145 mAh/g, and the charge-discharge efficiency (initial charge capacity/initial discharge capacity) was 96%.

Example 11

Positive electrode (2) was obtained by the same method as Example 10, except for using 85 wt % of $LiCoO_2$, 5 wt % of graphite, 5 wt % of polymer (1), 3 wt % of N-methyl- and 2 wt % of $LiN(CF_3SO_2)_2$ in the procedure for fabrication of the positive electrode of Example 10.

When positive electrode (2) was used to fabricate a cell and the charge-discharge characteristics of the cell were evaluated in the same manner as Example 10, the initial charge capacity was 142 mAh/g and the charge-discharge efficiency was 96%.

Example 12

Positive electrode (3) was obtained by the same method as Example 10, except for using 85 wt % of $LiCoO_2$, 5 wt % of graphite, 1 wt % of polymer (1), 8 wt % of N-methyl-N-propyl-pyrrolidinium/bis(fluorosulfonyl)imide and 1 wt % of $LiN(CF_3SO_2)_2$ in the procedure for fabrication of the positive electrode of Example 10.

When positive electrode (3) was used to fabricate a cell and the charge-discharge characteristics of the cell were evaluated in the same manner as Example 10, the initial charge capacity was 140 mAh/g and the charge-discharge efficiency was 95%.

Example 13

Positive electrode (4) was obtained by the same method as Example 10, except for using 85 wt % of $LiCoO_2$, 5 wt % of graphite, 3 wt % of polymer (1), 5 wt % of N,N-diethyl-N-methyl-N-methoxyethylammonium/bis(trifluoromethylsulfonyl)imide instead of N-methyl-N-propyl-pyrrolidinium/bis(fluorosulfonyl)imide as the ambient temperature molten salt and 2 wt % of $LiN(CF_3SO_2)_2$ in the procedure for fabrication of the positive electrode of Example 10.

When positive electrode (4) was used to fabricate a cell and the charge-discharge characteristics of the cell were evaluated in the same manner as Example 10, the initial charge capacity was 140 mAh/g and the charge-discharge efficiency was 96%.

Example 14

Positive electrode (5) was obtained by the same method as Example 10, except for using 85 wt % of $LiMn_2O_4$ as the positive electrode active material, 5 wt % of graphite, 3 wt % of polymer (1), 5 wt % of N-methyl-N-propyl-pyrrolidinium/bis(fluorosulfonyl)imide and 2 wt % of $LiN(CF_3SO_2)_2$ in the procedure for fabrication of the positive electrode of Example 10.

When positive electrode (5) was used to fabricate a cell and the charge-discharge characteristics of the cell were evaluated in the same manner as Example 10, the initial charge capacity was 142 mAh/g and the charge-discharge efficiency was 95%.

Example 15

Fabrication of Evaluation Cell Using Negative and Positive Electrodes

The negative electrode (1) of Example 1 and the positive electrode (1) of Example 10 were used with a polyethylene separator as the separator, and a mixture of N-methyl-N-propyl-pyrrolidinium/bis(fluorosulfonyl)imide and $LiN(CF_3SO_2)$ (mixing ratio: 80 wt %/20 wt %) as the electrolyte, to fabricate a cell for evaluation of the charge-discharge characteristics.

<Evaluation of Charge-Discharge Characteristics with Negative and Positive Electrodes>

The charge-discharge characteristics of the previously obtained cell were evaluated using a charge-discharge characteristic evaluator (HJR-1010 mSM8, product of Hokuto Denko Corp.) at a current density of 0.1C (where C represents the discharge rate) mA, a maximum voltage of 4.2 V and a minimum voltage of 3.0 V, at 25° C. under an argon atmosphere. The initial charge capacity obtained by the evaluation was 128 mAh/g, and the charge-discharge efficiency (initial charge capacity/initial discharge capacity) was 81%.

Comparative Example 1

In this example 90 wt % of natural graphite as the negative electrode active material and 10 wt % of polyvinylidene fluoride as the binder to prepare a negative electrode mixture, and the negative electrode mixture was dispersed in N-methyl-2-pyrrolidone as the organic solvent were combined to prepare a slurry for a secondary battery electrode. The slurry was evenly coated onto a 15 μm-thick copper foil used as the negative electrode current collector, and after drying, it was subjected to compression molding with a roll press to obtain negative electrode (10).

When negative electrode (10) was used to fabricate a cell and the charge-discharge characteristics of the cell were evaluated in the same manner as Example 1, the initial charge capacity was 260 mAh/g and the charge-discharge efficiency was 76%.

Comparative Example 2

In this example 85 wt % of $LiCoO_2$ as the positive electrode active material, 5 wt % of graphite as a conductive agent and 10 wt % of polyvinylidene fluoride as the binder were combined to prepare a positive electrode mixture, and the positive electrode mixture was dispersed in N-methyl-2-pyrrolidone as the organic solvent to prepare a positive electrode mixture slurry. The positive electrode mixture was evenly coated onto a 20 μm-thick aluminum foil used as the positive electrode current collector, and after drying, it was subjected to compression molding with a roll press to obtain positive electrode (6).

When positive electrode (6) was used to fabricate a cell and the charge-discharge characteristics of the cell were evaluated in the same manner as Example 10, the initial charge capacity was 120 mAh/g and the charge-discharge efficiency was 79%.

INDUSTRIAL APPLICABILITY

According to the invention it is possible to provide a secondary battery that exhibits excellent charge-discharge characteristics, and the invention is particularly effective for lithium secondary batteries. The slurry for a secondary battery electrode, electrode for a secondary battery and secondary battery according to the invention may be utilized in fields that employ such lithium secondary batteries. A specific field of application is that of portable electronic devices.

What is claimed is:

1. A slurry for a secondary battery electrode, comprising: an electrode active material; an ambient temperature molten salt composed of a cation component and an anion component; and a polymer,
    wherein the polymer has a structure derived from a monomer component which includes a salt monomer composed of an onium cation having a polymerizable functional group and an organic anion having a polymerizable functional group,
    wherein the onium cation is selected from the group consisting of: fluoronium cation ($F^+$); oxonium cation ($O^+$); sulfonium cation ($S^+$); ammonium cation ($N^+$); and phosphonium cation ($P^+$), and
    wherein the organic anion is selected from the group consisting of: $RO^-$ anions obtained by dissociation of protons of hydroxyl-containing organic compounds; $RS^-$ anions obtained by dissociation of protons of thiolates and thiophenolates; $RSO_3^-$; $RCOO^-$; phosphorus-containing derivative anions: $R_x(OR)_y(O)_zP^-$ obtained by replacing a portion of the hydroxyl groups of phosphoric acid or phosphorous acid with organic groups where x, y and z are integers of 0 or greater, and x+y+2z=3 or x+y+2z=5; $R_x(OR)_yB^-$ where x and y are integers of 0 or greater, and x+y=4; $R_x(OR)_yAl^-$ where x and y are integers of 0 or greater, and x+y=4; $(EA)_3C^-$; $(EA)_2N^-$; and anions wherein all or a portion of hydrogen(s) on the carbon(s) in the R as defined below is/are replaced with halogen atoms,
    wherein:
    EA independently represents hydrogen or an electron-withdrawing group, where at least one EA in an anion contains a polymerizable functional group,
    R independently represents: hydrogen; a substituted or unsubstituted alkyl $C_nH_{2n+1}$; aryl $(R')_n—C_6H_{5-n}—$; aralkyl $(R')_m—C_6H_{5-m}—C_nH_{2n}—$; alkenyl $R'—CH=CH—R'—$; aralkenyl $(R')_n—C_6H_{5-n}—CH=CH—R'—$; alkoxyalkyl $R'—O—C_nH_{2n}—$; or acyloxyalkyl $R'—COO—C_nH_2—$, where R may have a cyclic structure and may contain a heteroatom, and where at least one R in an anion contains a polymerizable functional group,
    R' independently represents hydrogen or a substituted or unsubstituted C20 or lower alkyl group,
    m represents an integer of 1-5, and
    n represents an integer of 1-20.

2. An electrode for a secondary battery, which comprises a current collector and an electrode active material layer, the electrode active material layer being formed by coating the current collector with a slurry for a secondary battery electrode according to claim 1.

3. A slurry for a secondary battery electrode according to claim 1, which further contains a lithium salt.

4. A secondary battery comprising a positive electrode, a negative electrode and an electrolyte, wherein either or both the positive electrode and negative electrode are electrodes for a secondary battery according to claim 2.

5. A slurry for a secondary battery electrode according to claim 1, wherein the anion component of the ambient temperature molten salt contains a fluorosulfonyl group.

6. A slurry for a secondary battery electrode according to claim 1, which further contains an organic solvent.

7. A slurry for a secondary battery electrode according to claim 1, which is for a positive electrode.

8. A slurry for a secondary battery electrode according to claim 7, which contains at least one compound selected from the group consisting of manganese complex oxides, nickel complex oxides, cobalt complex oxides and iron complex oxides as the electrode active material.

9. A slurry for a secondary battery electrode according to claim 1, which is for a negative electrode.

10. A slurry for a secondary battery electrode according to claim 9, wherein the electrode active material is a carbon-based material.

11. A slurry for a secondary battery electrode according to claim 10, wherein the carbon-based material is a nitrogen-containing carbon material.

12. A secondary battery according to claim 4, wherein the electrolyte contains an ambient temperature molten salt composed of a cation component and an anion component.

13. A process for production of an electrode for a secondary battery, which comprises coating a current collector metal foil with a slurry for a secondary battery electrode according to claim 1 to form a coated film on the current collector metal foil.

14. A process for production of an electrode for a secondary battery according to claim 13, which comprises heating and cooling the coated film to immobilize the electrode active material in the slurry for a secondary battery electrode on the current collector metal foil.

15. A secondary battery according to claim 12, wherein the anion component of the ambient temperature molten salt contains a fluorosulfonyl group.

* * * * *